US012067965B2

(12) United States Patent
Lee et al.

(10) Patent No.: US 12,067,965 B2
(45) **Date of Patent: *Aug. 20, 2024**

(54) DEVICE FOR SUPERSCATTERING ACOUSTIC WAVES

(71) Applicant: Toyota Motor Engineering & Manufacturing North America, Inc., Plano, TX (US)

(72) Inventors: Taehwa Lee, Ann Arbor, MI (US); Xiaopeng Li, Ann Arbor, MI (US); Ziqi Yu, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/591,138

(22) Filed: Feb. 2, 2022

(65) Prior Publication Data

US 2023/0245641 A1 Aug. 3, 2023

(51) Int. Cl.
*G10K 11/35* (2006.01)

(52) U.S. Cl.
CPC .................................. *G10K 11/357* (2013.01)

(58) Field of Classification Search
CPC ........... G10K 11/357; G10K 11/17857; G10K 11/17879; G10K 11/35; G10K 11/352; G10K 11/26; G10K 11/28; G10K 11/30; G10K 11/32; G10K 11/34; G10K 11/1787; G10K 11/17855; G10K 11/1785; G10K 11/178; G10K 11/175; G10K 11/162; G10K 11/006; G10K 11/18; G10K 15/00; G10K 11/04; G10K 11/343; H04R 2217/03; H04R 3/00; H04R 17/00; H04R 3/12; H04R 2201/401; H04R 23/00; H04R 3/04; H04R 1/403; H04R 19/00; H04R 2499/11; H04R 17/10; H04R 1/1041; H04R 2430/20; H04R 1/08; H04R 1/40; H04R 2420/07; H04R 31/00; H04R 17/005; H04R 2201/003;
(Continued)

(56) References Cited

U.S. PATENT DOCUMENTS 4,548,292 A 10/1985 Noxon
7,461,719 B2 * 12/2008 Tobik ........................ F01N 1/02
431/114

(Continued)

FOREIGN PATENT DOCUMENTS

CN 106205590 A 12/2016

OTHER PUBLICATIONS

Taehwa Lee, Directional Acoustic Superscattering by Coupled Resonators (Year: 2019).*

(Continued)

*Primary Examiner* — Daniel L Murphy
*Assistant Examiner* — Amie M Ndure
(74) *Attorney, Agent, or Firm* — Christopher G. Darrow; Darrow Mustafa PC

(57) ABSTRACT

A device for superscattering a target acoustic wave may include a body having an outer surface, at least one resonator being defined within the body and extending to an opening defined within the outer surface and configured to cause the superscattering of the target acoustic wave impinging upon the body, and a motor connected to the body and configured to selectively rotate the body.

20 Claims, 5 Drawing Sheets

(58) Field of Classification Search

CPC .......... H04R 1/00; H04R 1/005; H04R 1/023; H04R 1/1016; H04R 1/1025; H04R 1/20; H04R 1/227; H04R 1/26; H04R 1/2857; H04R 1/30; H04R 1/323; H04R 1/326; H04R 1/345; H04R 1/42; H04R 11/00; H04R 17/08; H04R 2201/40; H04R 2201/403; H04R 23/008; H04R 27/00; H04R 29/002; H04R 3/002; H04R 3/14; H04R 5/023; H04R 5/04; H04R 9/04; H04R 19/02; H04R 9/00; G01H 1/00; G01H 11/08; G01H 11/06; G01H 3/10; G01H 13/00; G01H 3/00; G01H 7/00; B60R 2022/208; B60R 21/0134; B60R 21/01536; B60R 21/01534; B60R 21/01538; B60R 25/25; B60R 25/255; B60R 25/257; B60R 11/0241; B60R 16/027; B60R 2001/1223; B60R 2001/1253; B60R 2021/0027; B60R 2021/01315; B60R 2021/23153; B60R 2021/26094; B60R 2021/2765; B60R 2022/4825; B60R 21/013; B60R 21/0152; B60R 21/01544; B60R 21/01548; B60R 21/21656; B60R 21/276; B60R 25/252; B60R 1/088; B60R 16/037; B60R 21/0136; B60R 21/01516; B60R 21/0154; B60R 21/01542; B60R 21/01552; B60R 21/01554; B60R 22/20; G01S 1/72; G01S 7/524; G01S 7/521; G01S 15/87; G01S 15/04; G01S 15/02; G01S 15/89; G01S 7/52004; G01S 7/5202; G01S 15/104; G01S 5/18; G01S 15/102; G01S 15/8925; G01S 15/96; G01S 7/52017; G01S 7/523; G01S 7/539; G01S 1/02; G01S 7/520003; G01S 7/52025; G01S 15/06; G01S 15/66; G01S 15/88; G01S 3/801; G01S 7/52096; G01S 15/10; G01S 15/101; G01S 15/14; G01S 15/34; G01S 15/931; G01S 3/8083; G01S 7/5208; G01S 7/537; G01S 11/14; G01S 15/18; G01S 15/60; G01S 15/8915; G01S 15/8993; G01S 7/282; G01S 7/526; G01S 1/68; G01S 1/725; G01S 1/805; G01S 15/325; G01S 15/50; G01S 15/8918; G01S 17/89; G01S 5/30; G01S 7/52034; G01S 7/52046; G01S 7/52079; G01S 7/527; G01S 1/753; G01S 15/08; G01S 15/108; G01S 15/8979; G01S 17/88; G01S 5/0226; G01S 7/52; G01S 7/529; G01S 7/534; G01S 1/751; G01S 1/76; G01S 11/16; G01S 13/04; G01S 13/12; G01S 13/225; G01S 13/28; G01S 13/30; G01S 13/325; G01S 13/60; G01S 15/003; G01S 15/105; G01S 15/107; G01S 15/12; G01S 15/52; G01S 15/58; G01S 15/582; G01S 15/86; G01S 15/876; G01S 15/8902; G01S 15/8922; G01S 15/8952; G01S 15/8959; G01S 15/8963; G01S 15/897; G01S 2201/07; G01S 3/808; G01S 5/0045; G01S 5/02585; G01S 5/20; G01S 5/22; G01S 5/24; G01S 5/26; G01S 7/034; G01S 7/292; G01S 7/36; G01S 7/4052; G01S 7/52019; G01S 7/52074; G01S 7/56; G01S 7/60; G01S 7/6272; G01S 1/783; G01S 13/0209; G01S 13/18; G01S 15/42; G01S 15/523; G01S 15/74; G01S 15/8927; G01S 15/8977; G01S 15/899; G01S 2007/52007; G01S 2201/025; G01S 5/0257; G01S 7/4082; G01S 7/417; G01S 7/4802; G01S 7/484; G01S 7/4911; G01S 7/52006; G01S 7/52082; G01S 7/52085; G01S 7/52098; G01S 17/00; G01S 15/00; G01S 2205/00; G01V 1/04; G01V 1/223; G01V 1/159; G01V 1/52; G01V 1/005; G01V 1/02; G01V 1/143; G01V 1/38; G01V 1/26; G01V 1/006; G01V 1/145; G01V 1/44; G01V 1/00; G01V 1/001; G01V 1/047; G01V 1/053; G01V 1/06; G01V 1/09; G01V 1/133; G01V 1/147; G01V 1/42; G01V 1/46; G01V 1/523; G01V 2210/1293; G01V 2210/1299; G01V 7/00; G01V 1/155; G01V 1/40; G01V 3/00; G01V 20/00

See application file for complete search history.

(56) References Cited

U.S. PATENT DOCUMENTS

| | | | | |
|---|---|---|---|---|
| 8,955,643 | B2 * | 2/2015 | Liu | F04D 29/441<br>60/725 |
| 8,995,643 | B2 | 3/2015 | Ma et al. | |
| 9,241,211 | B2 * | 1/2016 | Miki | H04R 1/2826 |
| 10,714,070 | B1 * | 7/2020 | Su | G10K 11/175 |
| 2012/0198854 | A1 * | 8/2012 | Schilp | F23R 3/06<br>60/755 |
| 2015/0083518 | A1 * | 3/2015 | Bonavides | G01V 1/143<br>181/106 |
| 2017/0122912 | A1 * | 5/2017 | Fattinger | G01N 29/032 |
| 2017/0168017 | A1 * | 6/2017 | Rivas | H03H 9/02007 |
| 2017/0206884 | A1 * | 7/2017 | Degrandis | G10K 11/20 |
| 2017/0227497 | A1 * | 8/2017 | Rivas | H10N 30/1051 |
| 2020/0388265 | A1 * | 12/2020 | Su | G10K 11/175 |
| 2021/0010977 | A1 * | 1/2021 | Lee | G01N 21/1702 |
| 2021/0383787 | A1 * | 12/2021 | Sorbel | G10K 11/32 |
| 2022/0043142 | A1 * | 2/2022 | Loos | G01S 7/52036 |

OTHER PUBLICATIONS

Vitalii I. Shcherbinin, Superscattering from Subwavelength Corrugated Cylinders (Year: 2020).*

Vineeth P. Ramachandran, Bandwidth-limited passive suppression of cylindrical source radiation using metamaterial based acoustic superscatterers (Year: 2023).*

Li Zhao, Enhanced scattering of acoustic waves at interfaces (Year: 2012).*

Fengming Liu, Superscattering of Sound by a Deep-Subwavelength Solid Mazelike Rod (Year: 2019).*

Y. Cheng et al. "Ultra-sparse metasurface for high reflection of low-frequency sound based on artificial Mie resonances." Nature Materials. Aug. 31, 2015.

J. Zhang et al. "Tunable directional subwavelength acoustic antenna based on Mie resonance." Scientific Reports. Jul. 3, 2018.

Zhichao Ruan et al. "Superscattering of Light from Subwavelength Nanostructures." Physical Review of Letters 105, 013901 (2010).

Chao Qian et al. "Experimental observation of scattering." Physical Review of Letters 122, 063901 (2019).

* cited by examiner

DEVICE FOR SUPERSCATTERING ACOUSTIC WAVES

TECHNICAL FIELD

The subject matter described herein relates in general to acoustic waves and, more particularly, to the scattering of acoustic waves.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Scattering is a fundamental interaction between objects and incident acoustic waves. Generally, scattering is a phenomenon in which acoustic waves deviate from a path due to localized non-uniformities in the medium through which they pass. For instance, non-resonant scatterers can scatter incident waves by their physical dimension. Acoustic wave scattering can be used in various applications, such as medical ultrasound or acoustic tiling.

SUMMARY

This section generally summarizes the disclosure and does not comprehensively explain its full scope or all its features.

In one embodiment, a device for superscattering a target acoustic wave may include a body having an outer surface, at least one resonator being defined within the body and extending to an opening defined within the outer surface, and a motor connected to the body and configured to selectively rotate the body. The at least one resonator may be configured to cause the superscattering of the target acoustic wave impinging upon the body.

In another embodiment, a device for superscattering a target acoustic wave may include a body having an outer surface, a plurality of resonators being defined within the body and extending to openings defined within the outer surface, and a motor connected to the body and configured to selectively rotate the body. The plurality of resonators may be configured to cause the superscattering of the target acoustic wave impinging upon the body. A superscattered cross-section of the target acoustic wave relative to the width of the body may be approximately 4:1 when the rotation speed of the motor is zero and changes as the rotation speed of the motor changes.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A superscattering device, in one example, can include a superscatterer having a body with an outer surface and at least one resonator is defined within the body. The resonator, being defined within the body, can extend towards an opening defined within the outer surface of the body. The at least one resonator is configured to cause the superscattering of a target acoustic wave impinging upon the body. The superscatterer may be similar to the device for superscattering described in U.S. Pat. App. Pub. No. 2021/0010977A1, which is herein incorporated by reference in its entirety.

In addition, the superscattering device includes a motor connected to the body and is configured to selectively rotate the body of the superscattering device. The rotation of the body of the superscattering device changes the superscattered cross-section of the target acoustic wave relative to the width of the body. When not rotating, the superscattered cross-section of the target acoustic wave relative to the width of the body may be approximately 4:1. However, the superscattered cross-section of the target acoustic wave relative to the width of the body changes as the rotational speed of the body changes.

"Superscattering" can refer to an acoustic wave scattering cross-section that is substantially larger than the cross-sectional size of the acoustic superscattering device. For instance, superscattering can refer to a ratio of an acoustic wave scattering cross-section to an acoustic superscattering device cross-section of at least about 4:1, at least about 5:1, at least about 6:1, at least about 7:1, at least about 8:1, at least about 9:1, or at least about 10:1. Alternatively or additionally, superscattering can refer to an acoustic wave scattering cross-section that is substantially larger than the wavelength of an acoustic wave. For instance, superscattering can refer to a ratio of an acoustic wave scattering cross-section to a wavelength of an acoustic wave of at least about 3:1, at least about 4:1, or at least about 5:1.

Figure 1A:
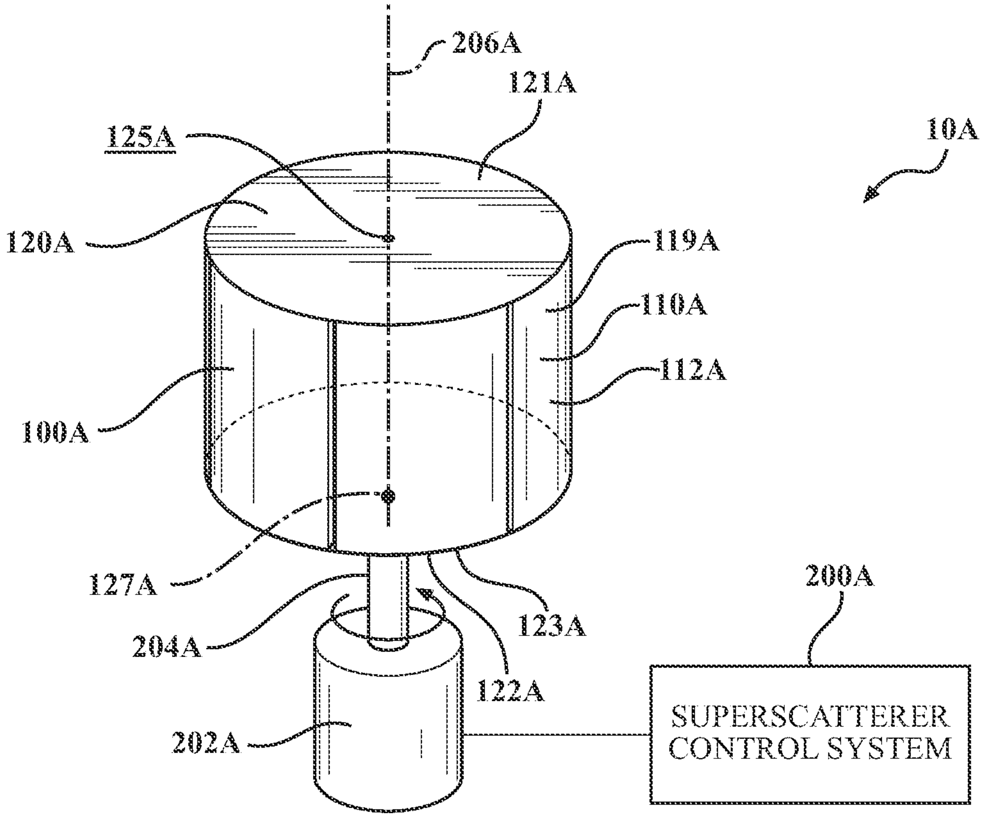
FIGS. 1A and 1B illustrate two examples of superscattering devices having motors that cause the superscatterer to rotate selectively.

Referring to FIG. 1A, illustrated is one example of a superscattering device 10A. In this example, the superscattering device 10A includes a superscatterer 100A. As will be described in greater detail later in this description, the superscatterer 100A includes a body 110A that defines one or more resonators. In this example, the body 110A of the superscatterer 100A is cylindrical. However, it should be understood that the body 110A of the superscatterer 100A can take any one of a number of different shapes. The body 110A can have an outer surface 112A.

Attached to the body 110A of the superscatterer 100A is a motor 202A. The motor 202A may be connected to the body 110A using a mechanical linkage, such as a shaft 204A. It should be understood that the connection between the motor 202A and the body 110A may take any one of a number of different forms. In this example, the shaft 204A performs the connection. However, other types of connections can be utilized as well. Furthermore, instead of utilizing a single shaft, the shaft 204A may be replaced with a powertrain system that allows multiple gear ratios to transfer power between the motor 202A and the body 110A of the superscatterer 100A.

As stated before, the body 110A of the superscattering device may be cylindrical in shape. The body 110A can include a curved portion 119A bounded by a first circular plane 121A and a second circular plane 123A. The first circular plane 121A and the second circular plane 123A may be substantially similar, each with center points 125A and 127A, respectively. The axis 206A of rotation of the body 110A caused by the motor 202A may generally be along the axis 206A that generally passes through the center points 125A and 127A of the circular planes 121A and 123A, respectively. The shaft 204A may be attached to the body 110A near the center point 127A and generally extends along a line defined by the axis 206A.

The motor 202A can be any device capable of rotating the body 110A of the superscatterer 100A. In one example, the motor 202A is an electric motor having an output shaft connected to the shaft 204A and/or form part of the shaft 204A. However, the motor 202A does not necessarily need to be an electric motor. For example, the motor 202A could be any device capable of generating mechanical power, such as thermal engines (internal combustion engines, diesel engines, external combustion engines, rotary engines, etc.), reaction engines (jet engines), and the like. Additionally, it should be understood that the motor 202A may be a single motor or could be multiple motors.

A superscatterer control system 200A controls the motor 202A. The superscatterer control system 200A provides the appropriate signaling for controlling the rotational speed of the body 110A by controlling the output of the motor 202A. The superscatterer control system 200A can vary based on the application. In some cases, the superscatterer control system 200A may be a simple on/off switch that causes the motor 202A to rotate in a certain direction at a certain speed. In other cases, the superscatterer control system 200A may include more sophisticated controls and may selectively cause the motor 202A to rotate in one direction or another, at different speeds, and at different durations based on the application.

Figure 1B:
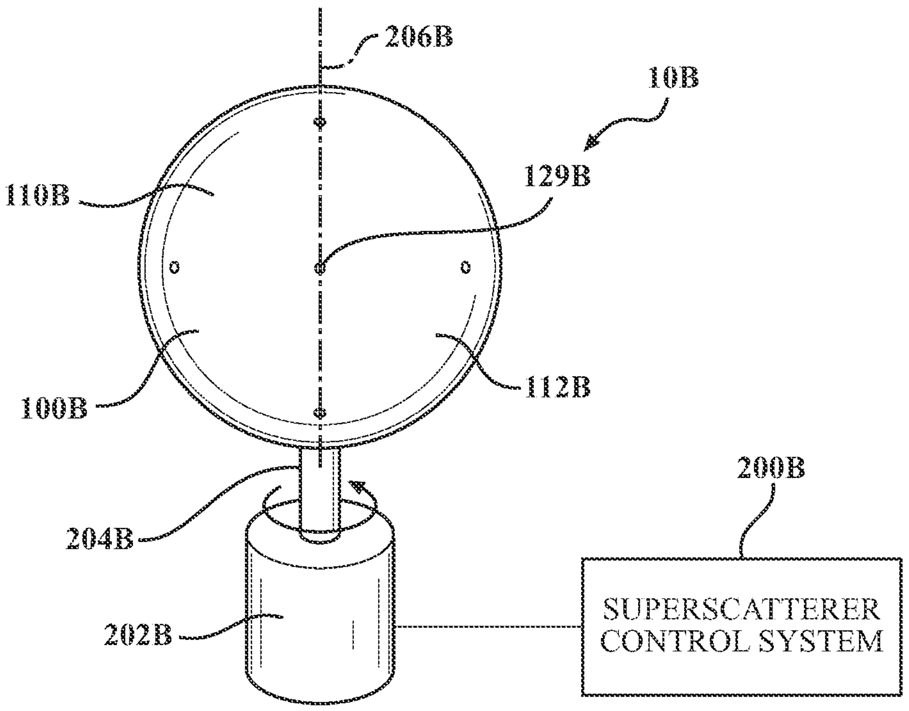

Referring to FIG. 1B, shown is another example of a superscattering device 10B that includes a superscatterer control system 200B. Unless otherwise specified, the previous description provided regarding the superscattering device 10A of FIG. 1A is equally applicable to the example shown in FIG. 1B. Like before, the superscattering device 10B includes a superscatterer 100B having a body 110B. The body 110B is connected to a motor 202B via a shaft 204B. However, the body 110B of the superscatterer 100B differs from the example shown in FIG. 1A in that the body 110B has an outer surface 112B that is substantially spherical. The shaft 204B is attached to the body 110B such that the axis 206B of rotation of the body 110B when being rotated by the motor 202B passes through the spherical center 129B of the body 110B.

While the examples provided in FIGS. 1A and 1B illustrate two different shapes for the bodies 110A (cylindrical) and 110B (spherical), it should be understood that the body could be other shapes, such as oval, polygonal triangular, rectangular, etc.

Figure 2A:
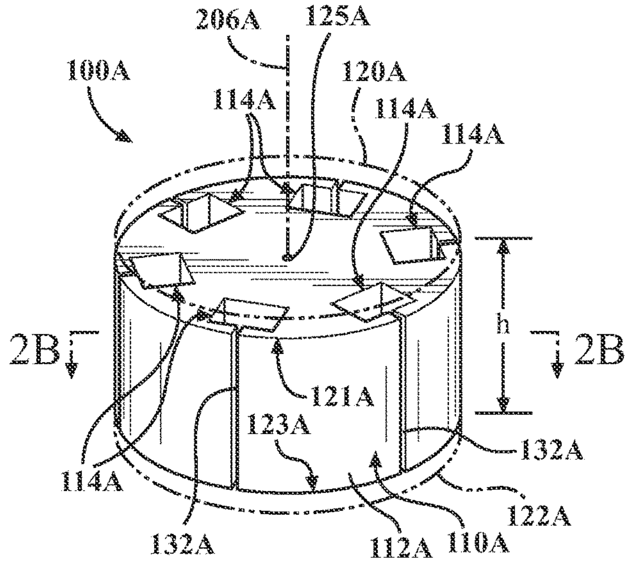
FIGS. 2A and 2B illustrate one example of a cylindrical superscatterer forming part of a superscattering device.
Figure 2B:
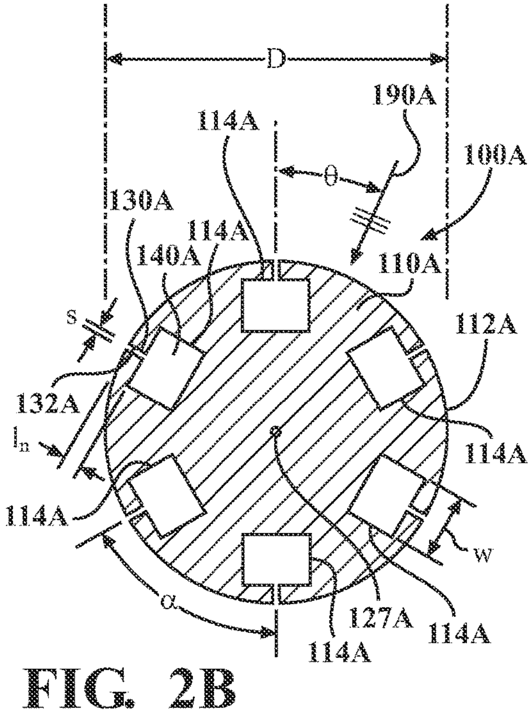

FIGS. 2A and 2B illustrate a more detailed view of the body 110A of the superscatterer 100A of FIG. 1A, with FIG. 2B being a cutaway view generally taken along lines 2B-2B of FIG. 2A. The body 110A can be made of any suitable material, such as plastic, metal, or glass, can be formed in any suitable manner, and can have any suitable shape. In at least some arrangements, when the body 110A has a substantially circular cross-sectional shape, the outer surface 112A can have an associated diameter (D). In other arrangements, when the body 110A does not have a substantially circular cross-sectional shape, the outer surface 112A can have an associated widthwise dimension. The diameter (D) can be smaller than the wavelength (A) of a target acoustic wave.

Here, the superscatterer 100A can be a subwavelength scatterer. As mentioned previously, in this example, the body 110A of the superscatterer 100A can be substantially cylindrical, having a height (h), and include a curved portion 119A bounded by a first circular plane 121A and a second circular plane 123A.

The first circular plane 121A can include a first endcap 120A, while the second circular plane 123A can include a second endcap 122A. In some arrangements, the first endcap 120A and/or the second endcap 122A can be formed as a unitary structure with the body 110A, such as by casting, machining, and/or three-dimensional printing. In other arrangements, the first endcap 120A and/or the second endcap 122A can be formed separately from the body 110A. In such case, the first endcap 120A and/or the second endcap 122A can be operatively connected to the body 110A in any suitable manner, such as by one or more fasteners, one or more adhesives, one or more welds, and/or one or more forms of mechanical engagement, etc.

The superscatterer 100A can include one or more resonator(s) 114A. If more than one resonator is utilized, in one example, the resonator(s) 114A may be substantially identical to each other and be substantially equally spaced from each other. However, it should be understood that in other examples, the resonator(s) 114A may differ from one another and may not be equally spaced apart from each other. The resonator(s) 114A can be defined at least in part by the body 110A. The resonator(s) 114A can open to the outer surface 112A of the body 110A. In one example, there is no acoustic and/or fluid communication between the resonator(s) 114A within the body 110A.

The resonator(s) 114A can have a width (w). The width (w) can be substantially smaller than the diameter (D) or, in the case of resonators with non-circular cross-sectional shapes, some other widthwise dimension of the body 110A. When the superscatterer 100A includes a plurality of resonator(s) 114A, the plurality of resonator(s) 114A can be distributed in any suitable manner about the superscatterer 100A. Neighboring resonator(s) 114A can have any suitable angle (a) between them. In one or more arrangements, the plurality of resonator(s) 114A can be substantially equally spaced about the superscatterer 100A. For example, neighboring resonator(s) 114A can be spaced at about 60 degrees relative to each other. In other arrangements, one or more resonator(s) 114A of the plurality of resonator(s) 114A can be non-equally spaced relative to the other resonators. In some arrangements, the resonator(s) 114A can be aligned with each other on opposite sides of the body 110A. However, one or more resonator(s) 114A can be offset from other resonator(s) 114A.

The superscatterer 100A can be configured to cause the superscattering of a target acoustic wave impinging upon the superscatterer 100A. The superscatterer 100A can be configured for a target acoustic wave by tuning the resonator(s) 114A to a target resonance frequency. For instance, the size, shape, and/or configuration of the resonator(s) 114A can be varied to achieve the desired target resonance frequency and/or superscattering performance.

In this example, the superscatterer 100A includes six resonator(s) 114A. The resonator(s) 114A can be Helmholtz resonators, but other types of resonators can also be utilized. The resonator(s) 114A can include a neck 130A and a cavity 140A. The neck 130A can have a width (s) and a length (la). The width (s) of the neck 130A can be narrow relative to the cavity 140A and can have any suitable shape. In this example, the neck 130A can be substantially rectangular in cross-sectional shape. The neck 130A can have an opening 132A defined within the outer surface 112A and having an opening area (A). In the particular configuration shown in FIGS. 2A-2B, the opening area (A) can be determined by: A=s*h. The cavity 140A can have a volume (V), which can be determined as appropriate depending on the geometry of the cavity 140A. The cavity 140A can have any suitable shape. In this example, the cavity 140A can be substantially rectangular prismatic in shape. The resonance frequency (f) of the resonator(s) 114A can be determined by $f=c/2\pi*(A/l_nV)^{1/2}$. In this equation, c is the speed of sound. As is shown in FIG. 2B, target acoustic waves 190A can be incident on the superscatterer 100A at an angle θ with respect to one of the resonator(s) 114A.

Figure 3A:
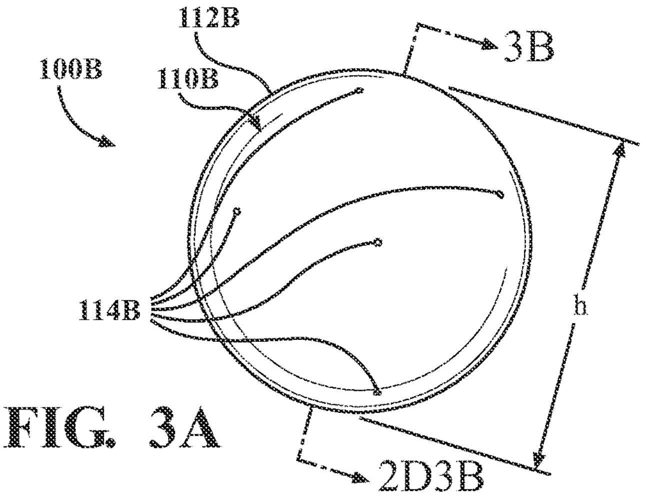
FIGS. 3A and 3B illustrate one example of a spherical superscatterer forming part of a superscattering device.
Figure 3B:
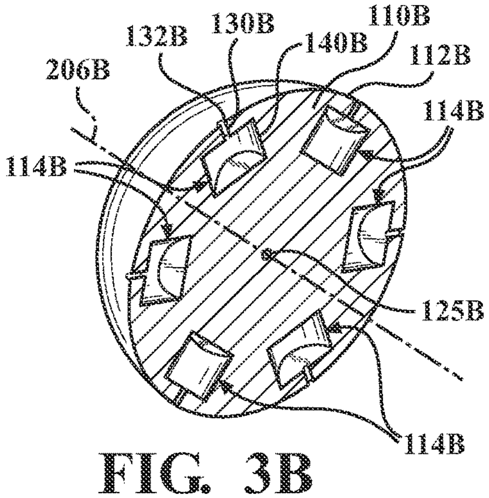

FIGS. 3A and 3B illustrate a more detailed view of the superscatterer 100B of FIG. 1B. Like before, the superscatterer 100B can be a subwavelength scatterer. The body 110B of the superscatterer 100B is substantially spherical. The body 110B can have a height (h), which, in the resonator configuration of FIGS. 3A and 3B, can be equal to the diameter of the body 110B.

The superscatterer 100B can include one or more resonator(s) 114B. Here, the resonator(s) 114B are substantially identical and shown to be Helmholtz resonators. However, it should be understood that the resonator(s) 114B can differ from each other and do not necessarily need to be Helmholtz resonators. Further still, while the resonator(s) 114B are substantially equally spaced from each other, they can also be non-equally spaced apart from each other as well.

As stated in the paragraph above, the resonator(s) 114B are Helmholtz resonators. As such, the resonator(s) 114B may include a neck 130B and a cavity 140B. The neck can have a width (s) and a length ($l_n$). The width (s) of the neck 130B can be narrow relative to the width of the cavity 140B. In this example, the neck 130B can be substantially circular in cross-sectional shape. The neck can have an opening area (A), which can be determined in this configuration by $A=\pi s^2/4$. The cavity 140B can have a volume (V), which can be determined as appropriate depending on the geometry of the cavity 140B. The cavity 140B can have any suitable shape. In this example, the cavity 140B can be substantially cylindrical in shape. The resonance frequency (f) of the resonator(s) 114B can be determined by $f=c/2\pi*(A/l_nV)^{1/2}$. In this equation, c is the speed of sound.

As mentioned previously, the plurality of resonator(s) 114B can be substantially identical to each other, as is shown above in connection with FIGS. 2A-2B and 3A-3B. In such arrangements, each of the plurality of resonator(s) 114B can be configured for the same target resonance frequency that generally matches the frequency of a target acoustic wave, such as the target acoustic wave 190A of FIG. 2B. However, in other arrangements, the target resonance frequency of one or more of the resonator(s) 114B can be slightly de-tuned by adjusting the size of the cavity 140B and/or the size of the neck 130B.

Figure 4:
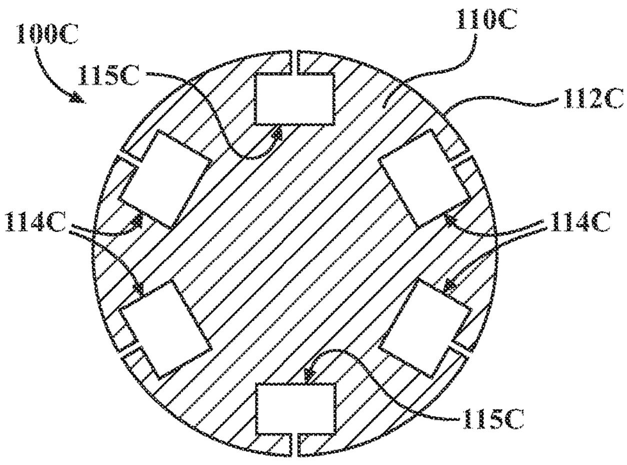
FIGS. 4-7 illustrate different examples of superscatters having different types of resonators.

One example of such an arrangement is shown in FIG. 4, which shows a cross-sectional view of an example of an acoustic superscattering device 100C with non-identical resonators. In this arrangement, two of the resonator(s) 115C can be de-tuned by reducing their cavity size. These resonator(s) 115C can be substantially identical to each other. The resonator(s) 115C can have any suitable spatial relationship relative to each other. In some instances, they can be opposite from each other, as is shown in FIG. 4. However, in other instances, the resonator(s) 115C can be neighboring resonators, or the resonator(s) 115C can be offset from each other.

Figure 5:
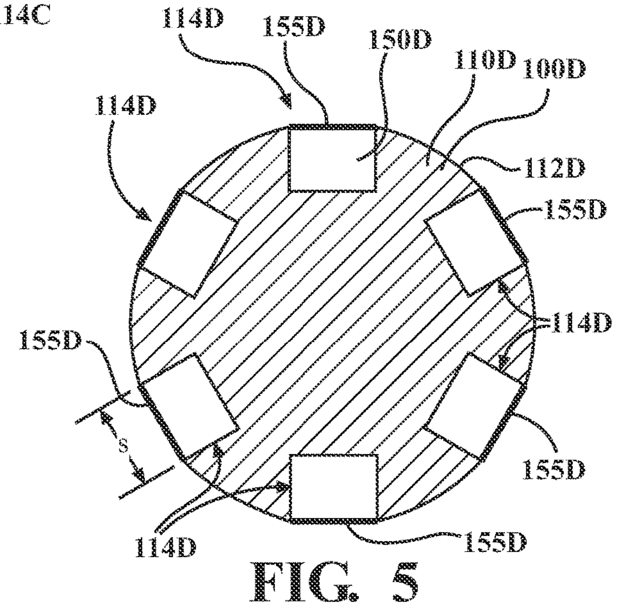

While the arrangements in FIGS. 2A-2B, 3A-3B, and 4 are directed to acoustic superscattering devices that include Helmholtz type resonators, it will be appreciated that acoustic superscattering devices, according to arrangements herein, can include other types of resonators. For example, referring to FIG. 5, the body 110D includes membrane-type resonators 114D. The membrane-type resonators 114D may include a cavity 150D defined in the body 110D. The cavity 150D can open to the outer surface 112D of the body 110D. The open end of the cavity 150D can be closed using a membrane 155D. The membrane 155D can be made of a thin, elastic material. In some arrangements, the cavity 150D can be filled with a gas backing, such as air or other gas. The membrane-type resonators are not in acoustic and/or fluid communication with each other within the body 110D.

Figure 6:
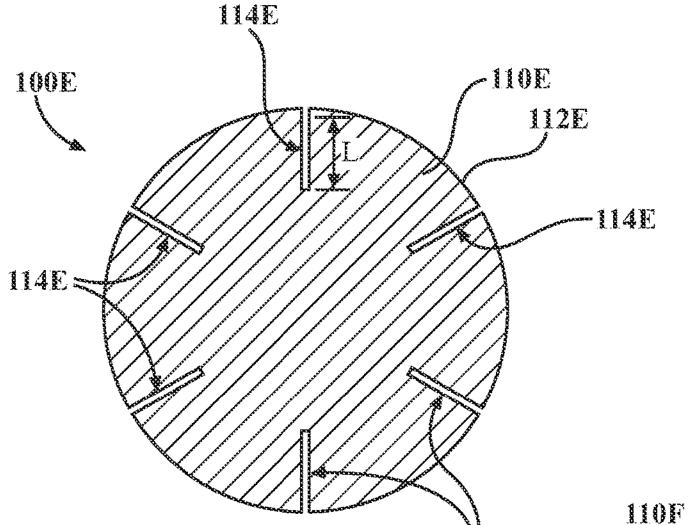

FIG. 6 illustrates another example of the body 110E having one or more quarter-wavelength resonator(s) 114E. In this example, the quarter-wavelength resonator(s) 114E can extend a distance (L) within the body 110E. In these arrangements, the quarter-wavelength resonator(s) 114E can open to the outer surface 112E of the body 110E. The quarter-wavelength resonator(s) 114E may not be in fluid and/or acoustic communication with each other within the body 110E.

Figure 7:
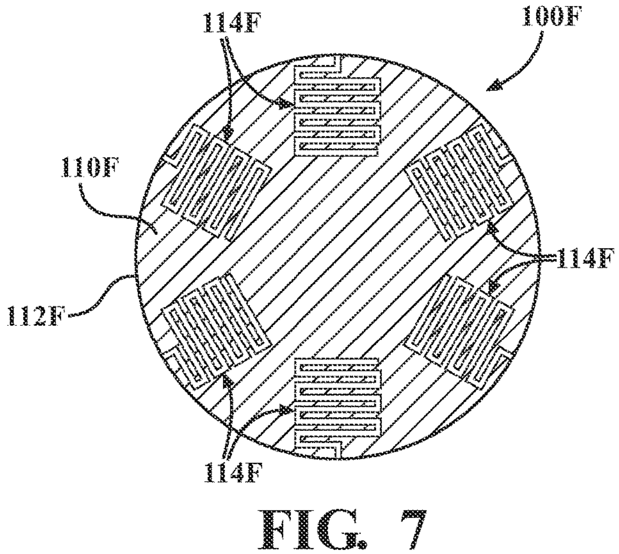

FIG. 7 illustrates another example of the body 110F having one or more coiled quarter-wavelength resonator(s) 114F. In this example, the coiled quarter-wavelength resonator(s) 114F have a coiled or serpentine channel. In these arrangements, the coiled quarter-wavelength resonator(s) 114F can open to the outer surface 112F of the body 110F. The coiled quarter-wavelength resonator(s) 114F may not be in fluid and/or acoustic communication with each other within the body 110F.

As mentioned previously, superscattering can refer to a ratio of an acoustic wave scattering cross-section to an acoustic superscattering device cross-section. Alternatively or additionally, superscattering can refer to an acoustic wave scattering cross-section that is substantially larger than the wavelength of an acoustic wave. In one example, the ratio of an acoustic wave scattering cross-section to an acoustic superscattering device cross-section, such as the cross-section of the superscatterer 100A of FIG. 1A is approximately 4:1 when the superscatterer 100A is not being rotated. The inventors have observed that the ratio changes as the rotational speed of a superscatterer changes. By having the motor 202A rotate the superscatterer 100A, the ratio can change the scattering capabilities of the superscatterer 100A.

Figure 8:
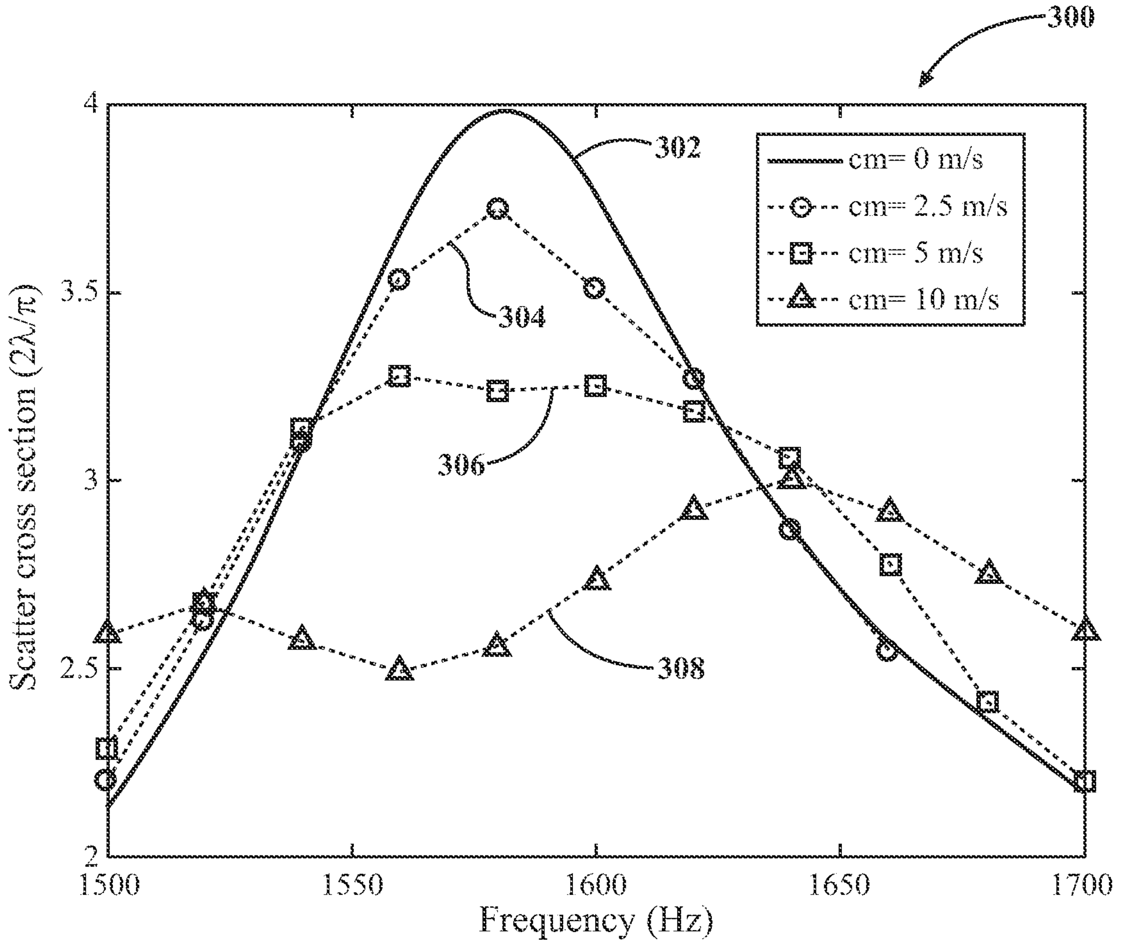
FIG. 8 illustrates changes to the scatterer cross-section as the superscatterer rotates.

FIG. 8 illustrates a chart 300 showing the change of the ratio of the acoustic wave scattering cross-section to the acoustic superscattering device cross-section when the superscatterer 100A is rotated at different rotational speeds. In this example, the resonator(s) 114A of the superscatterer 100A have a resonance frequency of approximately 1580 Hz. Here, when the rotational speed is zero, the superscatterer cross-section 302 is approximately 4:1 at 1580 Hz. However, when the rotational speed increases to 2.5 m/s, the superscatterer cross-section 304 is approximately 3.7:1 at 1580 Hz and becomes slightly flatter at other frequencies. When the rotational speed increases to 5 m/s, the superscatterer cross-section 306 is approximately 3.3:1 at 1580 Hz and continues to become even more flatter at other frequencies. Finally, when the rotational speed increases to 10 m/s, the superscatterer cross-section 308 is approximately 2.5:1 at 1580 Hz and continues to become even flatter at other frequencies—ranging from approximately 2.6:1 at 1500 Hz, bottoming out at 2.5:1 at 1560 Hz, peaking at 3:1 at 1640 Hz, and then returning to approximately 2.7:1 at 1700 Hz. This flattening of the superscatterer cross-section by rotating the superscatterer 100A can cause the scattering of acoustic waves across a broad range of frequencies.

Figure 9A:
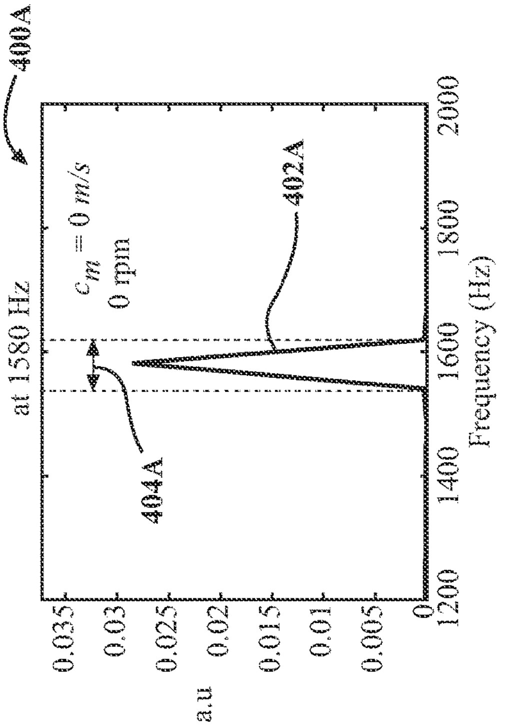
FIGS. 9A-9D illustrate shifted frequencies due to the rotation of the superscatterer.
Figure 9B:
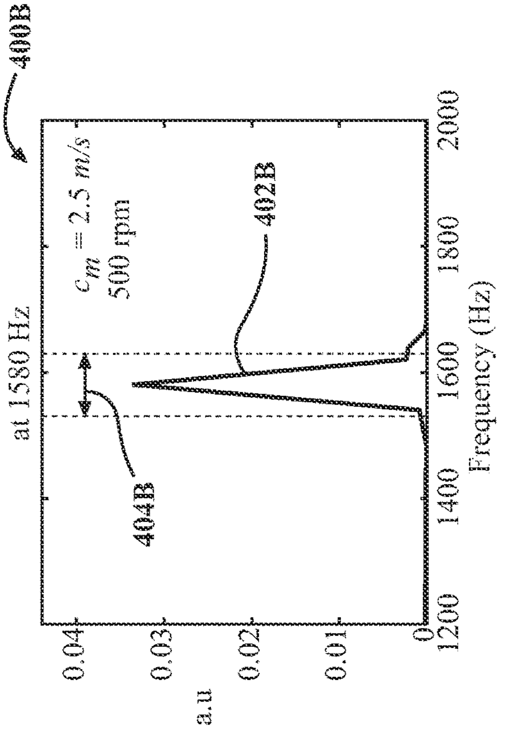

For example, FIGS. 9A-9D illustrates the scattering of different frequencies of acoustic waves based on the rotational speed of the body 110A. In this example, the resonator(s) 114A of the body 110A have a resonance frequency of approximately 1580 Hz. FIG. 9A illustrates the scattering 402A (sound pressure measurement) of an incoming acoustic wave when the rotational speed of the body 110A is zero. As such, the scattering generally occurs only across a narrow frequency band 404A, centered at 1580 Hz. In FIG. 9B, the rotational speed of the body 110A is approximately 2.5 m/s. Here, the scattering 402B occurs across a slightly wider frequency band 404B. Essentially, the rotation of the body 110A of the superscatterer 100A causes a shift in frequencies. While the scattering still occurs at approximately 1580 Hz, additional scattering occurs at +/−47 Hz from 1580 Hz.

Figure 9C:
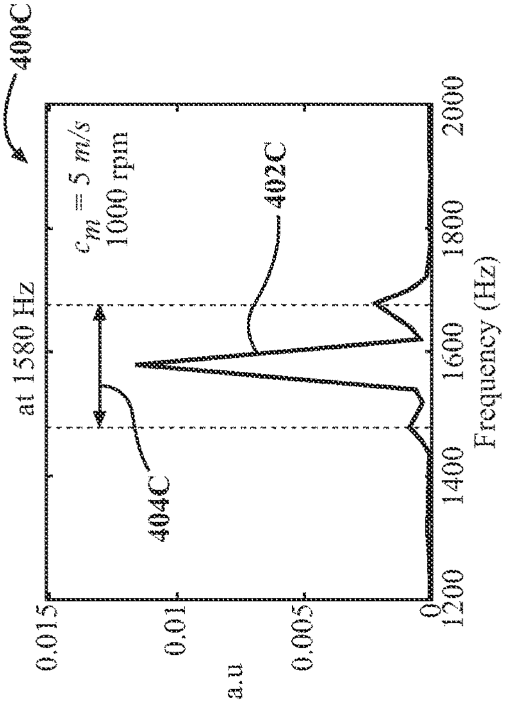

FIG. 9C increases the rotational speed of the body 110A to approximately 5 m/s, resulting in a scattering 402C across a wider frequency band 404C. Like before, scattering still occurs at approximately 1580 Hz, but additional scattering also occurs +/−95 Hz from 1580 Hz.

Figure 9D:
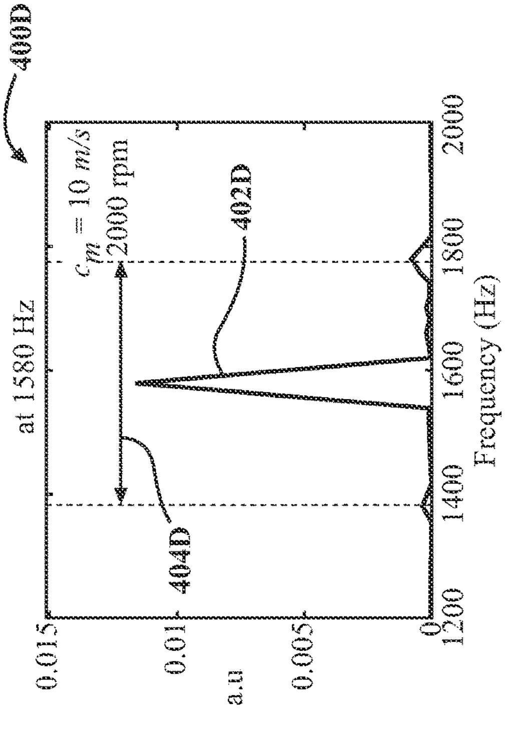

Finally, FIG. 9D increases the rotational speed of the body 110A to approximately 10 m/s, resulting in a scattering 402D across an even wider frequency band 404C. Again, scattering still occurs at approximately 1580 Hz, but additional scattering also occurs +/−191 Hz from 1580 Hz.

The shift in the frequencies due to the rotation of the superscatterer 100A, as shown in FIGS. 9A-9D, can be expressed as follows:

$$f_{\pm}=f_0\pm c_m N/2\pi R,$$

wherein $f_0$ is the frequency of the target acoustic wave, N is the number of resonators, $c_m$ is the velocity at the surface of the superscatterer 100A, and R is the radius of the superscatterer 100A.

As another example, arrangements described herein can be used for noise suppression. For instance, arrangements described herein can be used in connection with a building or other structure to create a quieter space. A plurality of acoustic superscattering devices, as described herein, can be distributed outside of the building. In some arrangements, the plurality of acoustic superscattering devices can be located at substantially the same distance away from the building. There can be any suitable spacing between the plurality of acoustic superscattering devices. In some arrangements, the plurality of acoustic superscattering devices can be substantially equally spaced apart. Because of their large scattering cross-sections that can vary based on rotation speed, the plurality of acoustic superscattering devices can collectively form a sound reflector. Thus, outside noise can be reflected away from the building and back toward the external environment. The plurality of acoustic superscattering devices can be configured to aesthetically blend in with the environment.

It will be appreciated that arrangements described herein can provide numerous benefits, including one or more of the benefits mentioned herein. For example, arrangements described herein can result in the superscattering of acoustic waves and incident angle-dependent scattering. According to the arrangements described herein, superscattering can be realized with relatively simple structures without using multilayer coatings. Arrangements described herein enable design flexibility, allowing various types of resonators to be used in connection with the acoustic superscattering device. The acoustic superscattering achieved by arrangements described herein can be desirable in various applications, such as acoustic sensing, acoustic particle levitation, and sparse noise barriers. Acoustic superscattering devices described herein can also be used in connection with acoustic sensors (detectors) or as a building block of acoustic metamaterials Detailed embodiments are disclosed herein. However, it is understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The terms "a" and "an," as used herein, are defined as one or more than one. As used herein, "plurality" is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes. Accordingly, reference should be made to the following claims, rather than to the foregoing specification, as indicating the scope hereof.

What is claimed is:

1. A device for superscattering a target acoustic wave comprising:

a body having an outer surface;

at least one resonator being defined within the body and extending to an opening defined within the outer surface, the at least one resonator being configured to cause the superscattering of the target acoustic wave impinging upon the body; and a motor connected to the body and configured to selectively rotate the body.

2. The device of claim 1, wherein the at least one resonator has a resonance frequency substantially similar to a frequency of the target acoustic wave.

3. The device of claim 1, wherein:

the body is substantially cylindrical and includes a curved surface and two circular planes at either ends of the curved surface, the opening of the at least one resonator defined within the curved surface, and the motor is connected to one of the two circular planes.

4. The device of claim 1, wherein the body is substantially spherical.

5. The device of claim 1, wherein a superscattered cross-section of the target acoustic wave relative to a width of the body is approximately 4:1 when a rotation speed of the motor is zero.

6. The device of claim 5, wherein the superscattered cross-section of the target acoustic wave relative to the width of the body changes as the rotation speed of the body changes.

7. The device of claim 1, wherein the body has a width and the width is smaller than a wavelength of the target acoustic wave.

8. The device of claim 1, wherein the at least one resonator has a width, wherein the body has a width, and wherein the width of the body is substantially larger than the width of the at least one resonator.

9. The device of claim 1, wherein the at least one resonator is at least one of: a Helmholtz resonator, a quarter wavelength resonator, and a membrane-type resonator.

10. The device of claim 1, wherein the at least one resonator is a plurality of resonators.

11. The device of claim 10, wherein the plurality of resonators are substantially equally spaced about the body.

12. The device of claim 10, wherein the plurality of resonators have substantially similar resonance frequencies.

13. The device of claim 10, wherein the plurality of resonators have different resonance frequencies.

14. A device for superscattering a target acoustic wave comprising:

a body having an outer surface;

a plurality of resonators being defined within the body and extending to an opening defined within the outer surface, the plurality of resonators being configured to cause the superscattering of the target acoustic wave impinging upon the body;

a motor connected to the body and configured to selectively rotate the body; and wherein a superscattered cross-section of the target acoustic wave relative to a width of the body is approximately 4:1 when a rotation speed of the body is zero and changes as the rotation speed of the body changes.

15. The device of claim 14, wherein the plurality of resonators have a resonance frequency substantially similar to a frequency of the target acoustic wave.

16. The device of claim 14, wherein:

the body is substantially cylindrical and includes a curved surface and two circular planes at either ends of the curved surface, the opening of the plurality of resonators defined within the curved surface, and the motor is connected to one of the two circular planes.

17. The device of claim 14, wherein the body is substantially spherical.

18. The device of claim 14, wherein the plurality of resonators are at least one of: a Helmholtz resonator, a quarter wavelength resonator, and a membrane-type resonator.

19. The device of claim 14, wherein the plurality of resonators are substantially equally spaced about the body.

20. The device of claim 14, the width of the body is smaller than a wavelength of the target acoustic wave.

* * * * *